US008848515B2

(12) United States Patent
Wen et al.

(10) Patent No.: US 8,848,515 B2
(45) Date of Patent: Sep. 30, 2014

(54) METHOD AND APPARATUS FOR TOPOLOGY DISCOVERY

(71) Applicant: Huawei Technologies Co., Ltd., Guangdong (CN)

(72) Inventors: Huafeng Wen, Nanjing (CN); Wenhai Wang, Nanjing (CN); Li Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 13/732,845

(22) Filed: Jan. 2, 2013

(65) Prior Publication Data
US 2013/0128771 A1 May 23, 2013

Related U.S. Application Data

(63) Continuation of application No. PCT/CN2011/073395, filed on Apr. 27, 2011.

(30) Foreign Application Priority Data

Jul. 2, 2010 (CN) .......................... 2010 1 0217577

(51) Int. Cl.
H04L 12/26 (2006.01)
H04L 12/46 (2006.01)
H04L 12/751 (2013.01)
H04L 12/24 (2006.01)
H04L 12/437 (2006.01)

(52) U.S. Cl.
CPC ............ *H04L 45/02* (2013.01); *H04L 12/4637* (2013.01); *H04L 41/12* (2013.01); *H04L 12/437* (2013.01)

USPC ............................ 370/222; 370/224; 370/460

(58) Field of Classification Search
CPC ... H04L 12/4637; H04L 12/437; H04L 45/02; H04L 41/12
USPC ............................................ 370/222, 224, 460
See application file for complete search history.

(56) References Cited

U.S. PATENT DOCUMENTS 5,925,137 A * 7/1999 Okanoue et al. ............... 714/4.1
6,578,086 B1 * 6/2003 Regan et al. ................... 709/242

(Continued)

FOREIGN PATENT DOCUMENTS

CN 1761219 A 4/2006
CN 101079780 A 11/2007

(Continued)

OTHER PUBLICATIONS

Supplementary European Search Report dated Aug. 7, 2013 in connection with European Patent Application No. EP 11 78 0139.

(Continued)

*Primary Examiner* — Omer S Mian

(57) ABSTRACT

A method and an apparatus for topology discovery are disclosed. Link state information of each port of each device on a ring network is confirmed through neighbor negotiation between a first device and a neighbor device, and by broadcasting a link state information base of each device to other devices on the ring network, each device on the ring network can obtain the newest and synchronous link state information of each port on the ring network, so that each network device on the ring network implements topology discovery of the ring network where the network device is located.

14 Claims, 4 Drawing Sheets

(56) References Cited

U.S. PATENT DOCUMENTS

| | | | |
|---|---|---|---|
| 6,751,682 B1* | 6/2004 | Stirling | 710/9 |
| 7,248,841 B2* | 7/2007 | Agee et al. | 455/101 |
| 2004/0103179 A1* | 5/2004 | Damm et al. | 709/223 |
| 2007/0081463 A1* | 4/2007 | Bohra et al. | 370/235 |
| 2009/0219808 A1* | 9/2009 | Ogura | 370/223 |
| 2010/0008373 A1* | 1/2010 | Xiao et al. | 370/401 |
| 2010/0260040 A1* | 10/2010 | Wu | 370/223 |

FOREIGN PATENT DOCUMENTS

| | | |
|---|---|---|
| CN | 101183982 A | 5/2008 |
| CN | 101227479 A | 7/2008 |
| CN | 101399737 A | 4/2009 |
| CN | 101409666 A | 4/2009 |
| CN | 101483608 A | 7/2009 |
| EP | 1 434 393 A2 | 6/2004 |
| EP | 2 352 253 A1 | 8/2011 |

OTHER PUBLICATIONS

International Search Report dated Aug. 11, 2011 in connection with International Patent Application No. PCT/CN2011/073395.
Partial translation of Office Action dated Apr. 11, 2013 in connection with Chinese Patent Application No. 201010217577.X.
Written Opinion of the International Searching Authority dated Aug. 11, 2011 in connection with International Patent Application No. PCT/CN2011/073395.
Partial translation of Office Action dated Sep. 24, 2012 in connection with Chinese Patent Application No. 201010217577.X.

* cited by examiner

METHOD AND APPARATUS FOR TOPOLOGY DISCOVERY

CROSS-REFERENCE

This application is a continuation of International Application No. PCT/CN2011/073395, filed on Apr. 27, 2011, which claims priority to Chinese Patent Application No. 201010217577.X, filed on Jul. 2, 2010, both of which are hereby incorporated by reference in their entireties.

TECHNICAL FIELD

The present application relates to the field of communications, and in particular, to a method and an apparatus for topology discovery.

BACKGROUND

Most of metropolitan area networks and enterprise networks are constructed by adopting a ring network. A technology adopted by the ring network is generally an RPR (Resilient Packet Ring, resilient packet ring) or an Ethernet ring. The RPR requires dedicated hardware, and therefore, its cost is relatively high and its application is relatively few; the Ethernet ring has a low cost and is widely applied.

As shown in FIG. 1, a general ring network includes a master node and transit nodes, and the master node includes an active port and a standby port. The working mechanism of the ring network is as follows: the active port of the master node periodically sends out a protocol packet, and the protocol packet is transmitted through the transit nodes on the ring network to the standby port of the master node; when the standby port can receive the protocol packet within specified time, the ring network is considered as complete; otherwise, it indicates that a fault exists in the ring network.

However, in the foregoing working mechanism, neither a network device as a master node nor a network device as a transit node supports topology discovery of the ring network, and then operations, such as accurate fault determination and blocked port designation, also cannot be performed on network devices on the ring network.

SUMMARY

In view of this, a technical problem to be solved in the present application is to provide a method and an apparatus for topology discovery, so as to implement, on each network device, topology discovery of a ring network where the network device is located.

The embodiments of the present application adopt the following technical solutions:

A topology discovery method is provided, where the method is applied in a ring network, the ring network includes a first device and a first neighbor device adjacent to the first device, and the method includes:

when determining to perform neighbor negotiation of the first device, sending, through a first port of the first device, a neighbor negotiation packet to the first neighbor device connected to the first port, where a second port of the first neighbor device is connected to the first port;

receiving, a neighbor negotiation reply packet returned by the first neighbor device, where the neighbor negotiation reply packet is generated according to an update result of link state information of the second port after the first neighbor device updates, according to the neighbor negotiation packet, the link state information of the second port;

according to the neighbor negotiation reply packet, updating link state information of the first port in the first device; and according to an update result of the link state information of the first port, broadcasting a link state information base of the first device according to predetermined configuration to other devices, except the first device, on the ring network, so that the other devices update, according to the link state information of the first port, local link state information bases, where the link state information base includes link state information of each port on the ring network.

A topology discovery apparatus is provided, where the apparatus is applied in a ring network, the ring network includes a first device and a first neighbor device adjacent to the first device, and the apparatus includes a sending unit, a receiving unit, a first update unit, and a broadcast unit, where the sending unit is configured to send, through a first port of the first device, a neighbor negotiation packet to the first neighbor device connected to the first port when determining to perform neighbor negotiation of the first device, where a second port of the first neighbor device is connected to the first port;

the receiving unit is configured to receive a neighbor negotiation reply packet returned by the first neighbor device, where the neighbor negotiation reply packet is generated according to an update result of link state information of the second port after the first neighbor device updates, according to the neighbor negotiation packet, the link state information of the second port;

the first update unit is configured to update, according to the neighbor negotiation reply packet, link state information of the first port in the first device; and the broadcast unit is configured to broadcast, according to an update result of the link state information of the first port, a link state information base of the first device according to predetermined configuration to other devices, except the first device, on the ring network, so that the other devices update, according to the link state information of the first port, local link state information bases, where the link state information base includes link state information of each port on the ring network.

According to the technical solutions of embodiments of the present application, the link state information of each port of each device on the ring network is confirmed through the neighbor negotiation between the first device and the neighbor device; and by broadcasting the link state information base of each device to the other devices on the ring network, each device on the ring network can obtain the newest and synchronous link state information of each port on the ring network, so that each network device on the ring network implements topology discovery of the ring network where the network device is located.

DETAILED DESCRIPTION

Implementation of a method and an apparatus for topology discovery according to embodiments of the present application is illustrated in detail in the following with reference to the accompanying drawings.

Figure 1:
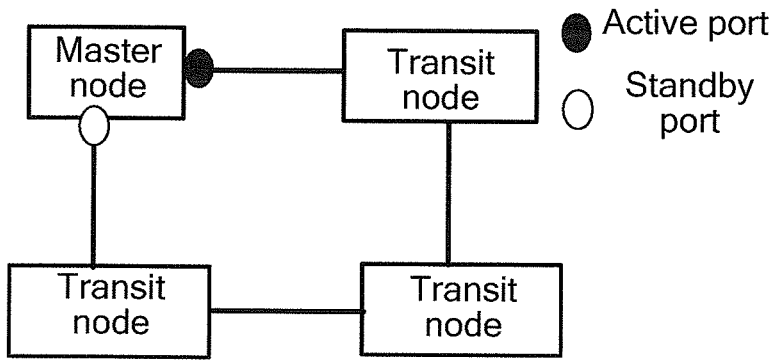
FIG. 1 is a schematic structural diagram of a ring network in the prior art.
Figure 2:
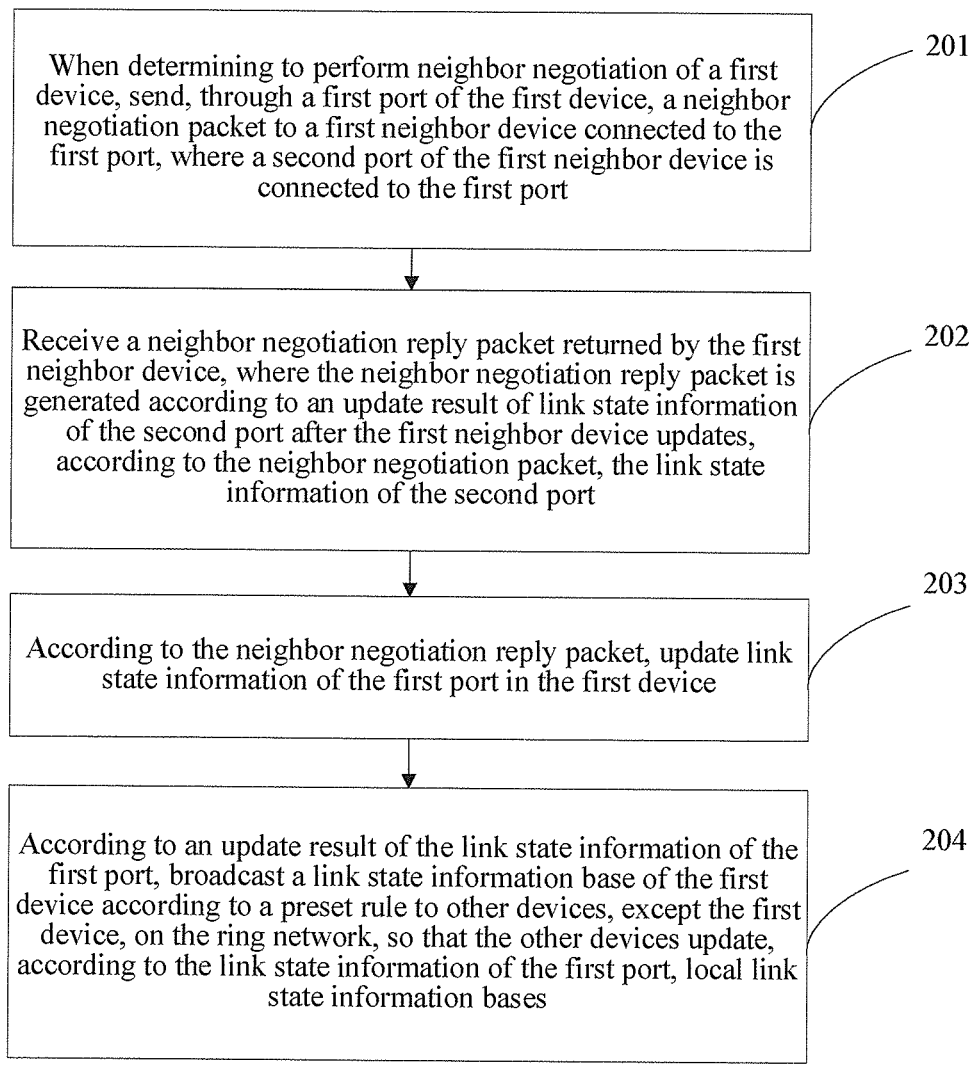
FIG. 2 is a schematic flow chart of a topology discovery method according to an embodiment of the present application.

FIG. 2 is a schematic flow chart of a topology discovery method according to an embodiment of the present application. The method may be applied in a ring network such as an Ethernet ring or an RPR, and the ring network includes a first device and a first neighbor device adjacent to the first device. As shown in FIG. 2, the topology discovery method includes:

Step 201: When determining to perform neighbor negotiation of the first device, send, through a first port of the first device, a neighbor negotiation packet to the first neighbor device connected to the first port, where a second port of the first neighbor device is connected to the first port.

Step 202: Receive a neighbor negotiation reply packet returned by the first neighbor device, where the neighbor negotiation reply packet is generated according to an update result of link state information of the second port after the first neighbor device updates, according to the neighbor negotiation packet, the link state information of the second port.

Step 203: According to the neighbor negotiation reply packet, update the link state information of the first port in the first device.

Step 204: According to an update result of the link state information of the first port, broadcast a link state information base of the first device according to predetermined configuration to other devices, except the first device, on the ring network, so that the other devices update, according to the link state information of the first port, local link state information bases, where the link state information base includes link state information of each port on the ring network.

In the embodiment of the present application as shown in FIG. 2, the link state information of each port of each device on the ring network is confirmed through the neighbor negotiation between the first device and the neighbor device, and by broadcasting the link state information base of each device to other devices on the ring network, each device on the ring network can obtain the newest and synchronous link state information of each port on the ring network, so that each network device on the ring network implements topology discovery of the ring network where the network device is located.

Figure 3:
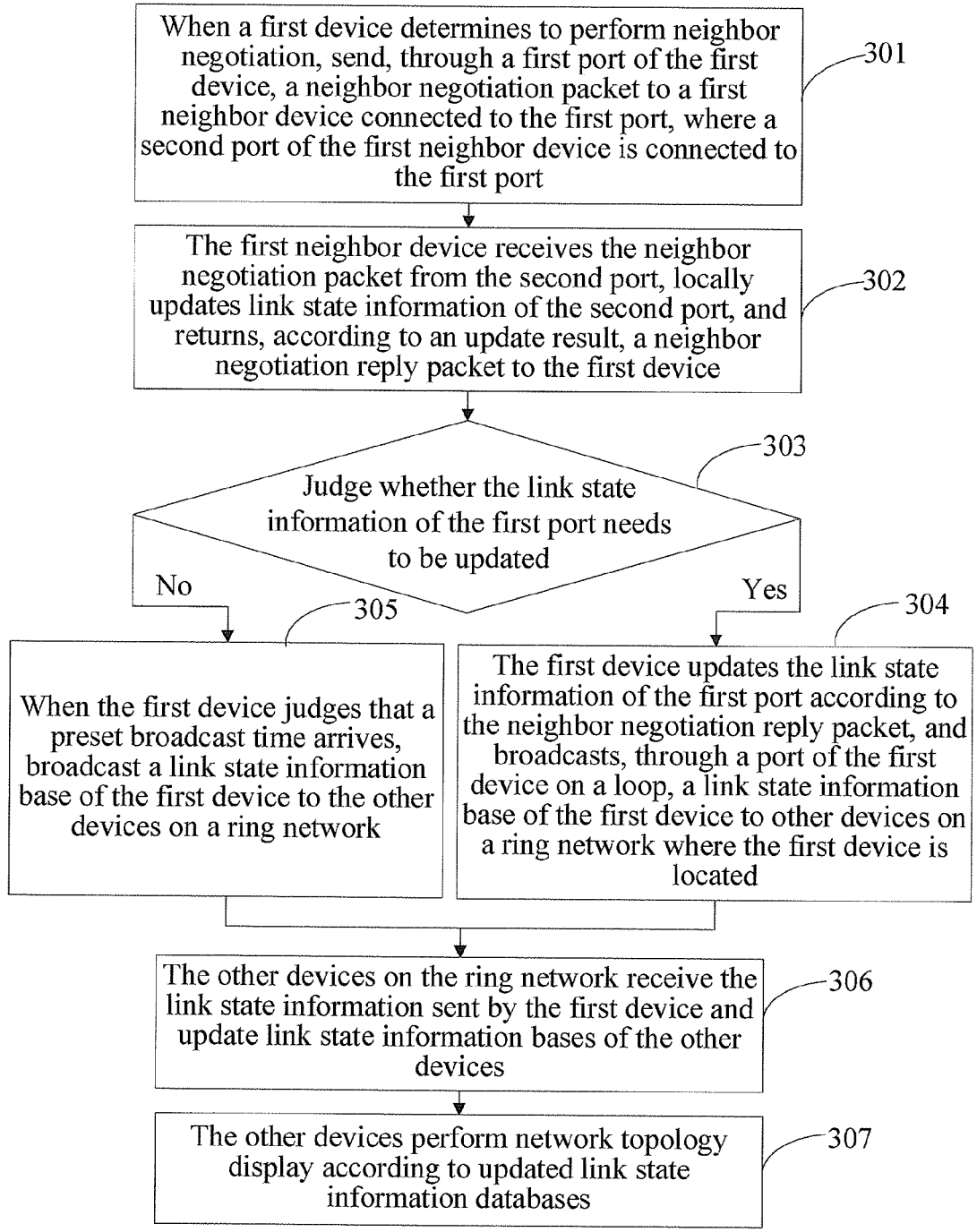
FIG. 3 is a schematic flow chart of another topology discovery method according to an embodiment of the present application.

On the basis of FIG. 2, a topology discovery method according to an embodiment of the present application is illustrated in more details in FIG. 3. The method is also applicable in a ring network such as an Ethernet ring or an RPR. As shown in FIG. 3, the topology discovery method according to the embodiment of the present application includes:

Step 301: When a first device determines to perform neighbor negotiation, send, through a first port of the first device, a neighbor negotiation packet to a first neighbor device connected to the first port, where a second port of the first neighbor device is connected to the first port.

Contents of the neighbor negotiation packet include a first port ID (identifier) and neighbor port information of the first port. In addition, the neighbor negotiation packet may further include:

a MAC (Media Access Control, media access control) address of the first device and a MAC address of the first neighbor device;

a protocol version number, an SEP (Smart Ethernet Protection, smart Ethernet protection) protocol ID, a protocol type (neighbor negotiation protocol), and a protocol subtype (protocol enabling); and information such as a network segment ID of a network segment in which the first port joins and a priority of the first port.

The neighbor port information of the first port is generally null or is a neighbor port ID of the first port.

Figure 4:
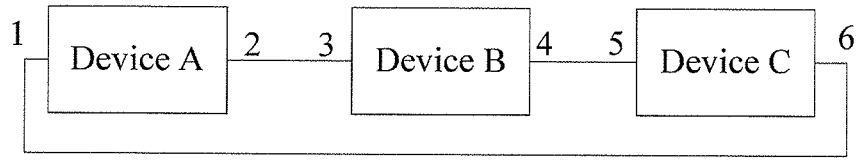
FIG. 4 is a schematic diagram of port connection of a ring network according to an embodiment of the present application.

Each device has at most two ports on a same ring network and the two ports are sibling ports of each other. On a ring network as shown in FIG. 4, a port 1 of a device A and a port 2 of the device A are the sibling ports of each other.

For the neighbor ports: two ports connected to each other of different devices on the ring network are neighbor ports of each other. For example, the port 2 of the device A and a port 3 of a device B as shown in FIG. 4 are neighbor ports of each other.

For the port ID: in order to identify different ports on the ring network, each port needs to be defined with a port ID. In the embodiment of the present application, the port ID may distinguish ports of different devices and may also distinguish different ports on a same device; therefore, the port ID may be represented by adopting two-dimensional information, which may specifically include: (1) a MAC address of a device where a port is located, and (2) a number of the port on the device. For example, for the ring network as shown in FIG. 4, it is supposed that a MAC address of the device A is 0001-AAAA-AAAA, a port ID of the port 1 of the device A may be represented as (0001-AAAA-AAAA, 1).

An occasion that the first device determines to perform the neighbor negotiation may be at the time when the first port of the first device enables the SEP protocol and a physical link where the first port is located is normal.

Step 302: The first neighbor device revives the neighbor negotiation packet from the second port, locally updates link state information of the second port, and returns, according to an update result, a neighbor negotiation reply packet to the first device from the second port.

In this step, the updating, by the first neighbor device, the link state information may include:

determining whether the second port receiving the neighbor negotiation packet has neighbor port information, and if no, updating the neighbor port information of the second port according to the received neighbor negotiation packet; and if yes, determining whether the neighbor port information of the second port and port information of the first port of the first device in the neighbor negotiation packet are the same, where if the information is different, it is determined that a collision occurs at neighbor ports of the second port, and if the information is the same, it indicates that the first neighbor device stores the information of the first port of the first device as the neighbor port information and the update may not be performed.

When no collision occurs at the neighbor port of the second port, contents carried in the neighbor negotiation reply packet are similar to the contents of the neighbor negotiation packet, and the difference only lies in that the neighbor port information which is of the second port and is in the neighbor negotiation reply packet is definite, while the neighbor port of the first port in the neighbor negotiation packet may be by default.

When a collision occurs at the neighbor port of the second port, the neighbor negotiation reply packet may not carry the neighbor port information of the second port, and other information may be the same as the information of the neighbor negotiation packet sent in an initial state.

Step 303: The first device receives the neighbor negotiation reply packet and determines, according to the neighbor negotiation reply packet, whether it needs to update the link state information of the first port; and if yes, perform step 304; otherwise, perform step 305.

In this step, the determining whether it needs to update the link state information of the first port includes:

comparing the link state information carried in the neighbor negotiation reply packet with the link state information which is of the first port and is stored in the first device; and if the information is consistent, not updating the link state information of the first port, and if the information is inconsistent, updating the link state information of the first port.

Step 304: The first device updates the link state information of the first port according to the neighbor negotiation reply packet, and broadcasts, through a port which is of the first device and is on a loop, a link state information base of the first device to other devices on the ring network where the first device is located; and step 306 is performed.

According to step 303, the neighbor negotiation reply packet received by the first device may carry the neighbor port information of the second port, and may also not carry the neighbor port information of the second port. However, no matter whether the reply packet carries the neighbor port information of the second port, it is certain that the neighbor port of the first port is necessarily the second port of the first neighbor device. Therefore, in step 303, whether it needs to update the neighbor port information of the first port may be determined according to a second port ID in the reply packet. If the neighbor port information of the first port is not the second port ID, it is determined to update the link state information of the first port. Therefore, in this step, the neighbor port information of the first port is updated according to the second port ID.

The foregoing interaction of the neighbor negotiation packet and the neighbor negotiation reply packet that are between the first device and the first neighbor device does not mean that the neighbor negotiation between the first device and the first neighbor device is accomplished, and only when the neighbor port collision does not occur in the first neighbor device, the first device and the first neighbor device determines that the neighbor negotiation between the two devices is successful; otherwise, the first device and the first neighbor device generally need to continue performing the foregoing interaction of the neighbor negotiation packet and the neighbor negotiation reply packet all the time or periodically until the neighbor negotiation is successful. However, the neighbor negotiation process has no effect on performing the following step 305 and subsequent steps, and for devices such as the first device and the first neighbor device, when the link state information in the neighbor negotiation is updated or a preset broadcast time arrives, the link state information base on the device is broadcast.

Step 305: When the first device determines that a preset broadcast time arrives, broadcast the link state information base of the first device to the other devices on the ring network; and step 306 is performed.

For each network device on the ring network, a start broadcast time and a broadcast period are set, respectively. When each broadcast time arrives, each network device spreads the link state information which is of all ports in a current network segment on the ring network and is saved by the network device to all other devices on the Ethernet ring, so as to guarantee consistency of link state information saved by each port on the network. Here, the link state information which is of all the ports in the current network segment on the ring network and is saved in each network device is called the link state information base.

Step 306: The other devices on the ring network receive the link state information sent by the first device and update link state information bases of the other devices.

In addition, for the first device, the other devices on the ring network also send information in local link state information bases of other devices according to preset configuration, so that the first device can also update the link state information base of the first device in real time, and perform subsequent topology display. An update process and a topology structure display process of the first device may be the same as update processes and topology structure display processes of the other devices, and are not repeatedly described here again.

In this step, the updating, by the other devices, the link state information bases of the other devices, may include:

receiving link state information broadcast by other devices, except the receiving device itself, on the ring network, and obtaining from the link state information a port ID and an ID of a network segment where the port is located;

searching, according to the port ID and the network segment ID, whether the local link state information base has corresponding link state information; and if no, directly saving the received link state information; and if yes, comparing whether the link state information saved locally and the received link state information are consistent; if the information is inconsistent, selecting the newest link state information of the port from the link state information which is of the port and is broadcast by the other devices and the link state information which is of the port and is saved locally, and updating the link state information which is of the port and is saved locally with the newest link state information.

Through the update process, each device on the ring network can obtain the newest and synchronous link state information of each port on the ring network.

For the link state information of each port, a serial number field may be set. Each time the link state information of the port is updated, 1 is added to the serial number, so that the comparing which link state information is the newest in this step can be implemented by only comparing the serial numbers. Alternatively, an update time field may also be set, so that the comparing which link state information is the newest in this step may be implemented by comparing the update time.

Step 307: The other devices perform network topology display according to updated link state information databases.

A specific display method may include:

Step A: Determine a start point port among all the ports.

Specifically, implementation of this step may be:

determining whether a port whose running state is an active edge port exists among all the ports, and if the port whose running state is the active edge port exists among all the ports, determining the port whose running state is the active edge port as the start point port;

if the port whose running state is the active edge port does not exist among all the ports, determining whether ports whose running states are standby edge ports exist among all the ports; and if the ports whose running states are the standby edge ports exist among all the ports, determining a port with a minimum port ID among the standby edge ports as the start point port; and if neither the port whose running state is the active edge port nor the ports whose running states are the standby edge ports exist among all the ports, determining a port with a minimum port ID among all the ports as the start point port.

Step B: Display the start point port.

Step C: Determine whether the start point port has a neighbor port and the neighbor port is not displayed, and if the start point port has the neighbor port and the neighbor port is not displayed, use the neighbor port of the start point port as a next start point port, and return to step B; otherwise, enter step D.

Step D: Determine whether the start point port has a sibling port and the sibling port is not displayed; and if the start point port has the sibling port and the sibling port is not displayed, use the sibling port of the start point port as a next start point port, and return to step B; otherwise, end the topology display.

The running state of the port may be classified into an active edge port, a standby edge port, a common port, and so on.

Figure 5:
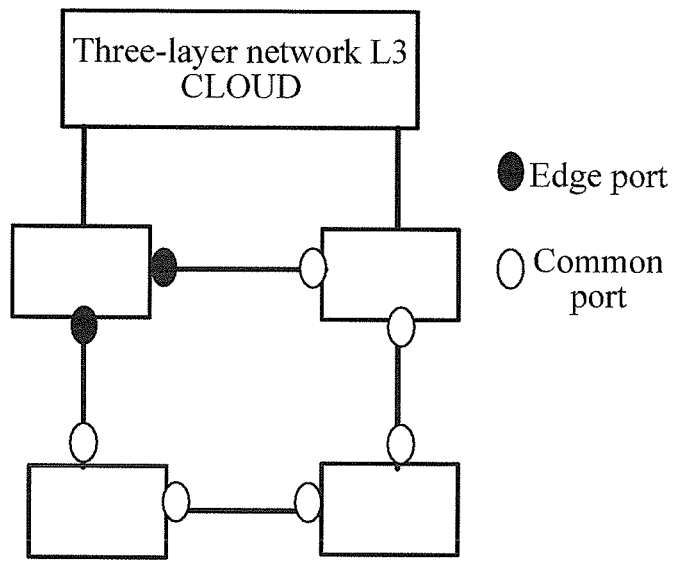
FIG. 5 is a schematic structural diagram of a closed ring according to an embodiment of the present application.
Figure 6:
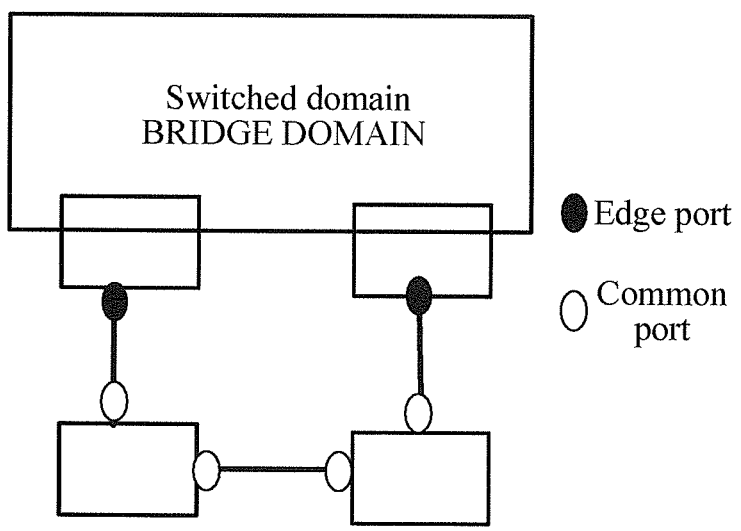
FIG. 6 is a schematic structural diagram of an open ring according to an embodiment of the present application.
Figure 7:
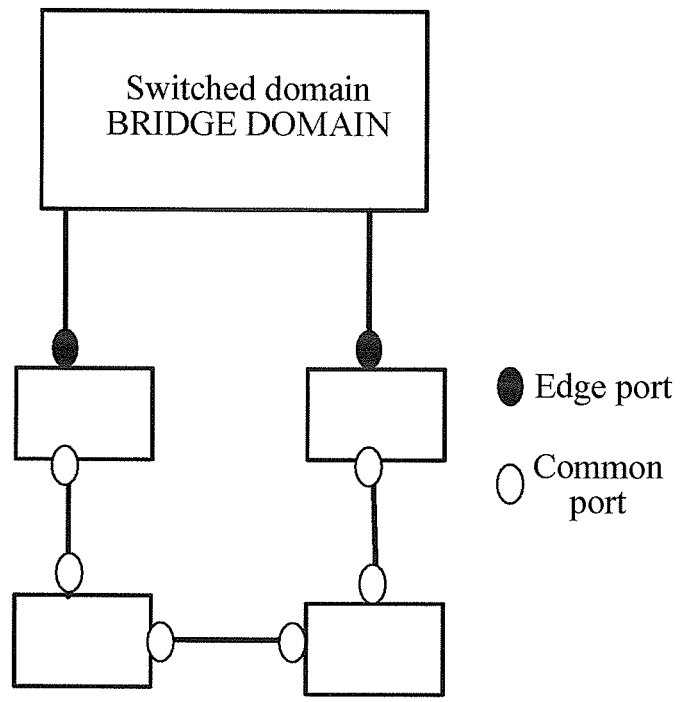
FIG. 7 is a schematic structural diagram of another open ring according to an embodiment of the present application.

In a practical application, the ring network may be classified into two forms: a closed ring as shown in FIG. 5 and open rings as shown in FIG. 6 and FIG. 7. The ports on the ring network have two roles in total: edge ports and common ports. For the open rings as shown in FIG. 6 and FIG. 7, the edge ports refer to ports that are not connected to the other devices on the loop; and for the closed ring as shown in FIG. 5, the edge ports on the ring may be designated by a user or determined in advance according to certain preset configuration (for example, one or two ports with a minimum port ID are configured as edge ports). Specifically, the edge ports maybe classified into two kinds: active edge ports and standby edge ports. Each ring network (including an open ring and a closed ring) has two edge ports, the active edge port is a port elected from the two edge ports, and a common port does not participate in the election of the active edge port. The edge ports have two kinds of roles: a management state and a running state. The management state is decided by the configuration and the running state is decided by the election of the active edge port, and the election logic may be shown as Table 1:

TABLE 1

| Management State of the Port 1 | Management State of the Port 2 | Election Result |
|---|---|---|
| Active edge port | Active edge port | The running state of a port with a smaller ID is the active edge port; and the running state of the other port is the standby edge port. |
| Standby edge port | Standby edge port | The running state of a port with a smaller ID is the active edge port; and the running state of the other port is the standby edge port. |
| Active edge port | Standby edge port | The running state of the port 1 is the active edge port; and The running state of the port 2 is the standby edge port. |

When the ring network is normal and the neighbor negotiation is normal, each device on a same ring network has a same link state information base and a same active edge port is elected.

In the method for topology display according to the embodiment of the present application as shown in FIG. 3, a unidirectional loop problem of unidirectional communication link fault time can be solved by the neighbor negotiation between the adjacent network devices on the ring network, a blocked port can be flexibly designated on a device by establishing a synchronous link state information base on each network device of the ring network, and the maintainability of the network can be improved by performing the topology display of a whole ring network on each network device.

Specifically, the so-called unidirectional communication means that, a link has traffic in two directions: way-out and way-in, and if traffic in one of the two directions is interrupted, the unidirectional communication occurs; for example, the unidirectional communication may occur in a case that a fiber is connected in a wrong way. Because the neighbor negotiation needs two ports to send a packet to each other, as long as communication in one direction fails (unidirectional communication fails or bi-directional communication fails), the neighbor negotiation cannot succeed. Therefore, the unidirectional loop problem of the unidirectional communication fault time may be detected through the neighbor negotiation.

Information of ports on the link may be learned by establishing the synchronous link state information base. In this way, which port needs to be blocked can be designated on a device, so as to implement the flexibly designating the blocked port.

Figure 8:
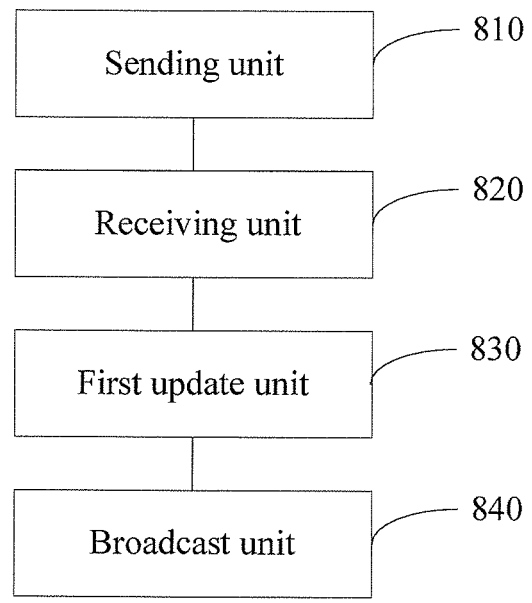
FIG. 8 is a schematic structural diagram of a topology discovery apparatus according to an embodiment of the present application.

Corresponding to the foregoing topology discovery method according to the embodiment of the present application, an embodiment of the present application further provides a topology discovery apparatus. As shown in FIG. 8, the apparatus may be set in each network device of a ring network and the apparatus includes a sending unit 810, a receiving unit 820, a first update unit 830, and a broadcast unit 840, where the sending unit 810 is configured to send, through a first port of a first device, a neighbor negotiation packet to a first neighbor device connected to the first port when determining to perform neighbor negotiation of the first device, where a second port of the first neighbor device is connected to the first port;

the receiving unit 820 is configured to receive a neighbor negotiation reply packet returned by the first neighbor device, where the neighbor negotiation reply packet is generated according to an update result of link state information of the second port after the first neighbor device updates, according to the neighbor negotiation packet, the link state information of the second port;

the first update unit 830 is configured to update, according to the neighbor negotiation reply packet, link state information of the first port in the first device; and the broadcast unit 840 is configured to broadcast, according to an update result of the link state information of the first port, a link state information base of the first device according to predetermined configuration to the other devices, except the first device, on the ring network, so that the other devices update, according to the link state information of the first port, local link state information bases, where the link state information base includes link state information of each port on the ring network.

The broadcast unit 840 may further include:

a first broadcast subunit, configured to broadcast, through a port which is of the first device and is on a loop, the link state information base of the first device to the other devices on the network when the link state information of the first port is updated; and a second broadcast subunit, configured to broadcast, through the port which is of the first device and is on the loop, the local link state information base to the other devices on the network when the link state information of the first port is not updated and it is determined that a preset broadcast time arrives.

Optionally, the apparatus may further include:

a second update unit, configured to receive link state information sent according to predetermined configuration by the other devices, and update the link state information base of the first device, where the second update unit may be specifically configured to: receive the link state information sent according to the predetermined configuration by the other devices; and for link state information of each port on the loop, when comparing whether the link state information of the port in the first device and the link state information which is of the port and is sent by the other devices are not the same, determine the newest link state information of the port, and update the link state information of the port in the first device with the newest link state information.

Optionally, the apparatus may further include:

a display unit, configured to perform topology display of the ring network according to the link state information of each port in the link state information base of the first device, where the display unit may include:

a start point determining subunit, configured to determine a start point port among all ports of the ring network;

a display subunit, configured to display the start point port;

a first determination subunit, configured to determine whether the start point port has a neighbor port and the neighbor port is not displayed, and if yes, use the neighbor port as a next start point port, and enter the display subunit; otherwise, enter a second determination subunit; and the second determination subunit, configured to, when determining that the start point port has a sibling port and the sibling port is not displayed, use the sibling port as a next start point port, and enter the display subunit.

Optionally, the start point determining subunit may be specifically configured to: determine whether a port whose running state is an active edge port exists among all the ports, and if the port whose running state is the active edge port exists among all the ports, determine the port whose running state is the active edge port as the start point port; if the port whose running state is the active edge port does not exist among all the ports, determine whether ports whose running states are standby edge ports exist among all the ports, and if the ports whose running states are the standby edge ports exist among all the ports, determine a port with a minimum port ID among the ports whose running states are standby edge ports as the start point port; and if neither a port whose running state is the active edge port nor ports whose running states are the standby edge ports exist among all the ports, determine a port with a minimum port ID among all the ports as the start point port.

The topology discovery apparatus according to the embodiment of the present application as shown in FIG. 8 confirms the link state information of the ports of each device on the loop on the ring network through the neighbor negotiation between the first device and the neighbor device, and broadcasts the link state information base of each device to the other devices on the ring network, so that each device on the ring network can obtain the newest and synchronous link state information of each port on the ring network, and each network device of the ring network implements topology discovery of the ring network where the network device is located.

Persons of ordinary skill in the art may understand that the process of the topology discovery method in the foregoing embodiments may be implemented by a program instructing relevant hardware. The program may be stored in a readable storage medium. When the program runs, corresponding steps in the foregoing method are performed. The storage medium may be a ROM/RAM, a magnetic disk, a compact disk, and so on.

The foregoing descriptions are merely exemplary embodiments of the present application, and it should be noted that persons of ordinary skill in the art may further make various improvements and refinements without departing from the principle of the present application. These improvements and refinements should also fall within the protection scope of the present application.

What is claimed is:

1. A topology discovery method for use in a ring network comprising a first device and a first neighbor device adjacent to the first device, the method comprising:

when determining to perform neighbor negotiation of the first device, sending, through a first port of the first device, a neighbor negotiation packet to the first neighbor device connected to the first port, wherein a second port of the first neighbor device is connected to the first port;

receiving a neighbor negotiation reply packet returned by the first neighbor device, wherein the neighbor negotiation reply packet is generated according to an update result of link state information of the second port after the first neighbor device updates, according to the neighbor negotiation packet, the link state information of the second port;

according to the neighbor negotiation reply packet, updating link state information of the first port in the first device; and according to an update result of the link state information of the first port, broadcasting a link state information base of the first device according to predetermined configuration to a set of devices including all the devices, except the first device, on the ring network, so that the set of devices update, according to the link state information of the first port, local link state information bases, wherein the link state information base comprises link state information of each port on the ring network.

2. The method according to claim 1, wherein the broadcasting the link state information base of the first device according to the predetermined configuration to the set of devices on the ring network comprises: when the link state information of the first port is updated, broadcasting the link state information base of the first device through a port which is of the first device and is on a loop to the set of devices on the network; and when the link state information of the first port is not updated and it is determined that a preset broadcast time arrives, broadcasting a local link state information base through the port which is of the first device and is on the loop to the set of devices on the network.

3. The method according to claim 1, further comprising: receiving link state information sent according to predetermined configuration by the set of devices, and updating the link state information base of the first device.

4. The method according to claim 3, wherein the updating the link state information base of the first device comprises: for the link state information of each port, when comparing whether the link state information of the port in the first device and the link state information which is of the port and is sent by the set of devices are not the same, determining the newest link state information of the port, and updating the link state information of the port in the first device with the newest link state information.

5. The method according to claim 1, further comprising: according to the link state information of each port in the link state information base of the first device, performing topology display of the ring network.

6. The method according to claim 5, wherein the performing the topology display of the ring network comprises: determining a start point port among all ports of the ring network; displaying the start point port; determining whether the start point port has a neighbor port and the neighbor port is not displayed, and if yes, using the neighbor port as a next start point port and returning to the step of displaying the start point port; and otherwise, when determining that the start point port has a sibling port and the sibling port is not displayed, using the sibling port as a next start point port and returning to the step of displaying the start point port.

7. The method according to claim 6, wherein the determining the start point port among all the ports of the network comprises: determining whether a port whose running state is an active edge port exists among all the ports, and if the port whose running state is the active edge port exists, determining the port whose running state is the active edge port as the start point port; if the port whose running state is the active edge port does not exist among all the ports, determining whether ports whose running states are standby edge ports exist among all the ports, and if the ports whose running states are the standby edge ports exist among all the ports, determining a port with a minimum port ID among the standby edge ports as the start point port; and if neither the port whose running state is the active edge port nor the ports whose running states are the standby edge ports exist among all the ports, determining a port with a minimum port ID among all the ports as the start point port.

8. A topology discovery apparatus for use in a ring network comprising a first device and a first neighbor device adjacent to the first device, the apparatus comprising:
a sending unit, configured to send, through a first port of the first device, a neighbor negotiation packet to the first neighbor device connected to the first port when determining to perform neighbor negotiation of the first device, wherein a second port of the first neighbor device is connected to the first port; and
a receiving unit, configured to receive a neighbor negotiation reply packet returned by the first neighbor device, wherein the neighbor negotiation reply packet is generated according to an update result of link state information of the second port after the first neighbor device updates, according to the neighbor negotiation packet, the link state information of the second port;
wherein the first device further configured to:
update, according to the neighbor negotiation reply packet, link state information of the first port in the first device; and
broadcast, according to an update result of the link state information of the first port, a link state information base of the first device according to predetermined configuration to a set of devices including all the devices, except the first device, on the ring network, so that the set of devices update, according to the link state information of the first port, local link state information bases, wherein the link state information base comprises link state information of each port on the ring network.

9. The apparatus according to claim 8, wherein the first device is further configured to: broadcast, through a port which is of the first device and is on a loop, the link state information base of the first device to the set of devices on the network when the link state information of the first port is updated; and broadcast, through the port which is of the first device and is on the loop, the local link state information base to the set of devices on the network when the link state information of the first port is not updated and it is determined that a preset broadcast time arrives.

10. The apparatus according to claim 8, further configured to receive link state information sent according to predetermined configuration by the set of devices, and update the link state information base of the first device.

11. The apparatus according to claim 10, wherein first device is further configured to: receive the link state information sent according to the predetermined configuration by the set of devices; and for link state information of each port, when comparing whether the link state information of the port in the first device and the link state information which is of the port and is sent by the set of devices are not the same, determine the newest link state information of the port and update the link state information of the port in the first device with the newest link state information.

12. The apparatus according to claim 8, further comprising: a display unit, configured to perform topology display of the ring network according to the link state information of each port in the link state information base of the first device.

13. The apparatus according to claim 12, wherein the display unit further configured to: determine a start point port among all ports of the ring network; display the start point port; determine whether the start point port has a neighbor port and the neighbor port is not displayed, and if yes, use the neighbor port as a next start point port, and display the next start point port; otherwise, when determining that the start point port has a sibling port and the sibling port is not displayed, use the sibling port as a next start point port, and display the next start point port.

14. The apparatus according to claim 13, wherein first device is further configured to: determine whether a port whose running state is an active edge port exists among all the ports, and if the port whose running state is the active edge port exists among all the ports, determine the port whose running state is the active edge port as the start point port; if the port whose running state is the active edge port does not exist among all the ports, determine whether ports whose running states are standby edge ports exist among all the ports, and if the ports whose running states are the standby edge ports exist among all the ports, determine a port with a minimum port ID among the ports whose running states are the standby edge ports as the start point port; and if neither the port whose running state is the active edge port nor the ports whose running states are standby edge ports exist among all the ports, determine a port with a minimum port ID among all the ports as the start point port.

* * * * *